Patented June 20, 1944

2,351,658

UNITED STATES PATENT OFFICE 2,351,658

STABILIZATION OF VINYL ESTERS

Allan Berne-Allen, Jr., Waynesboro, Va., assignor to E. I. du Pont de Nemours & Company, Wilmington, Del., a corporation of Delaware No Drawing. Application December 18, 1941, Serial No. 423,556

11 Claims. (Cl. 260—488)

This invention relates to the stabilization of vinyl esters against polymerization, and more particularly to the stabilization of vinyl acetate.

Vinyl esters such as vinyl acetate spontaneously polymerize on standing at room temperature and it has been customary to add thereto a small amount of an agent during or after the final rectification to maintain the vinyl esters in the monomeric state during storage and transfer. When the vinyl ester is to be used, it is freshly distilled to free it from the polymerization inhibitor and then immediately used before any substantial undesirable polymerization takes place.

However, none of the agents heretofore employed in vinyl esters or in vinyl ester-bearing liquors to inhibit polymerization has proven entirely satisfactory. Some of the so-called inhibitors are not sufficiently effective in small quantities; others, as for instance sulfur, corrode the copper equipment ordinarily used in subsequent operations and/or are only slightly soluble in vinyl esters and, on evaporation of the vinyl acetate, the stabilizing agents may cause stoppage within the still or be removed from the still-kettle only with difficulty; still others, copper resinate for example, may introduce an undesirable ion (copper) into the manufacturing system, thereby introducing the possibility of inadvertently forming copper acetylide should the copper ion come in contact with acetylene under suitable condition of pH and moisture.

An object of this invention, therefore, is to provide a class of polymerization inhibitors for vinyl ester compositions, which are highly efficient in their action, which do not corrode the apparatus, which do not operate to introduce undesirable impurities into the manufacturing system, and which are stable under the conditions of operation. A further object is to provide polymerization inhibitors particularly adapted for use in vinyl acetate and vinyl acetate-bearing liquors. A still further object is in the provision of stabilized vinyl ester monomer compositions which can be stored for long periods of time without undergoing substantial polymerization. The above stated and other objects will more clearly appear from the following description.

These objects are accomplished by my invention which, briefly stated, comprises employing quaternary onium compounds as polymerization inhibitors for vinyl esters and especially monomeric vinyl esters by adding a small amount of a quaternary onium compound to the vinyl ester or ester-bearing liquor during processing, storage, or transit.

The quaternary onium compounds of this invention may be defined as those containing a pentavalent atom of group V of the periodic table, e. g. nitrogen, phosphorus, arsenic and antimony, wherein four valences are satisfied by linkage to carbon and the fifth valence is satisfied by an anion. As specific compounds falling within this definition that are particularly satisfactory may be mentioned the tetraalkyl ammonium salts such as tetraethyl ammonium acetate, tetrapropyl ammonium resinate, triamyl ethyl ammonium acetate, triamyl methyl ammonium acetate, trimethyl cyclohexyl ammonium acetate, triethyl cyclohexyl ammonium resinate; the trialkyl monoaryl ammonium salts, such as trimethyl phenyl ammonium acetate, triethyl phenyl ammonium resinate; the trialkyl monoaralkyl ammonium salts, such as trimethyl benzyl ammonium acetate, triethyl benzyl ammonium acetate, triamyl benzyl ammonium acetate; the alkyl pyridinium salts such as ethyl pyridinium acetate; the alkoxyalkyl trialkyl ammonium salts; the alkoxyalkyl dialkyl monoaryl ammonium salts; the betaines; the quaternary morpholinium and piperidinium compounds; the quaternary phosphonium compounds such as tetramethyl phosphonium acetate, tetraethyl phosphonium acetate; and the quaternary arsonium compounds such as tetraethyl arsonium acetate.

The quaternary onium compounds may be in the form of a salt such as acetate, propionate, butyrate, sulfate, resinate, etc. or may be added to the ester-bearing liquor in the form of the hydroxide. Salts or other compounds containing the following cations are preferred: tetramethyl ammonium-, trimethyl phenyl ammonium-, dimethyl ethyl phenyl ammonium, methyl diethyl phenyl ammonium-, and triethyl phenyl ammonium-. Preferably no more than one aromatic group should be contained in the quaternary onium compound although it has been found that the presence of one aromatic group is advantageous. The alkyl or aryl group may be substituted, the substituent atom or group being hydroxyl, halogen, carboxyl, nitrile, amino, etc.

Only a very small amount of a quaternary onium compound need be used to give a marked improvement in stability. The preferred range of concentration is between about 0.01% and about 0.2% by weight of the vinyl ester monomer.

To further illustrate this invention, the following specific examples are given. Parts are by weight.

Example I 0.1 part of triethylbenzylammonium acetate was added to 100 parts of rectified vinyl acetate monomer. This sample and a control were refluxed simultaneously for three hours, at the end of which time the control showed 23.8% polymer by weight, while the stabilized sample showed only 0.05% polymer. (Polymer percentage was determined by evaporating a weighed sample to dryness and weighing the residue.)

Example II 0.1 part of trimethylbenzylammonium acetate was added to 100 parts of rectified vinyl acetate monomer. This sample and a control were refluxed simultaneously for three hours. At the end of this time, the control showed 10.6% polymer by weight, while the stabilized sample showed only 0.3% polymer.

Example III 0.1 part of trimethylbenzylammonium resinate was added to 100 parts of rectified vinyl acetate monomer. This sample and a control were refluxed simultaneously for three hours. The control showed 10.6% polymer by weight, while the stabilized sample showed only 0.3% polymer.

Although my invention has been described specifically from the standpoint of stabilizing vinyl acetate against polymerization, it is not so limited but is applicable as well to the stabilization of other vinyl esters or vinyl ester-bearing liquor.

Furthermore, my invention can be used for the stabilization of vinyl esters or vinyl ester-bearing liquors at any convenient stage, but is especially useful during the final stages of rectification and in stabilizing vinyl acetate monomer that has previously been rectified, until its time in storage, in transit, etc. is over.

I claim:

1. The process which comprises adding a quaternary ammonium compound to a vinyl ester-containing composition whereby to inhibit polymerization of the vinyl ester.

2. The process which comprises adding to a vinyl ester-containing composition from about 0.01% to about 0.2% by weight, based on the weight of the ester, of a quaternary ammonium compound whereby to inhibit polymerization of the vinyl ester.

3. The process which comprises adding to monomeric vinyl acetate from about 0.01% to about 0.2% by weight, based on the weight of the vinyl acetate, of a quaternary ammonium compound whereby to inhibit polymerization of the vinyl ester.

4. The process which comprises adding to monomeric vinyl acetate from about 0.01% to about 0.2% by weight, based on the weight of the vinyl acetate, of a quaternary ammonium compound containing one aromatic group whereby to inhibit polymerization of the vinyl ester.

5. A composition comprising vinyl ester and an amount of quaternary ammonium compound sufficient to prevent substantial polymerization of said vinyl ester.

6. A composition containing monomeric vinyl ester and from about 0.01% to about 0.2% by weight, based on the weight of the vinyl ester, of a quaternary ammonium compound.

7. A composition comprising monomeric vinyl acetate and an amount of quaternary ammonium compound sufficient to prevent substantial polymerization of said vinyl acetate.

8. A composition containing monomeric vinyl acetate and from about 0.01% to about 0.2% by weight, based on the weight of the vinyl acetate, of a quaternary ammonium compound.

9. The process which comprises adding to a vinyl ester-containing composition a compound of a pentavalent atom of the group consisting of nitrogen, phosphorous, arsenic, and antimony wherein four valences are satisfied by linkage to carbon and the fifth valence is satisfied by an anion, whereby to inhibit polymerization of the vinyl ester.

10. The process which comprises adding to a vinyl ester-containing composition from about 0.01% to about 0.2% by weight, based on the weight of the ester, of a compound of the group consisting of nitrogen, phosphorous, arsenic, and antimony wherein four valences are satisfied by linkage to carbon and the fifth valence is satisfied by an anion, whereby to inhibit polymerization of the vinyl ester.

11. The composition comprising vinyl ester and from about 0.01% to about 0.2% by weight, based on the weight of the ester, of a compound of the group consisting of nitrogen, phosphorous, arsenic, and antimony wherein four valences are satisfied by linkage to carbon and the fifth valence is satisfied by an anion.

ALLAN BERNE-ALLEN, JR.